United States Patent [19]

Ando et al.

[11] Patent Number: 4,584,636
[45] Date of Patent: Apr. 22, 1986

[54] AC-TO-DC POWER CONVERTER WITH IMPROVED POWER FACTOR AND OVERVOLTAGE SUPPRESSION

[75] Inventors: Takeki Ando, Naka; Toshiaki Kurosawa; Hiroaki Kuroha, both of Katsuta; Yoshio Sakai, Naka, all of Japan

[73] Assignee: Hitachi, Ltd., Tokyo, Japan

[21] Appl. No.: 473,729

[22] Filed: Mar. 9, 1983

[30] Foreign Application Priority Data

Mar. 10, 1982 [JP]   Japan .................................. 57-36471

[51] Int. Cl.[4] .......................................... H02M 7/162
[52] U.S. Cl. ...................................... 363/54; 318/811;
363/44; 363/129
[58] Field of Search ................... 318/762, 811; 363/34, 363/35, 84, 85, 87, 125, 128, 129, 54, 44

[56] References Cited

U.S. PATENT DOCUMENTS

| | | | |
|---|---|---|---|
| 3,622,862 | 11/1971 | Boksjo | 363/54 |
| 3,842,335 | 10/1974 | Boksjo | 363/54 |
| 4,245,293 | 1/1981 | Terunuma et al. | 363/87 |
| 4,272,807 | 6/1981 | Gallagher | 363/34 |
| 4,361,866 | 11/1982 | Shima et al. | 363/129 |
| 4,447,868 | 5/1984 | Turnbull | 363/87 |

FOREIGN PATENT DOCUMENTS 2076233  11/1981  United Kingdom .

*Primary Examiner*—William H. Beha, Jr.
*Assistant Examiner*—Jeffrey Sterrett
*Attorney, Agent, or Firm*—Antonelli, Terry & Wands

[57] ABSTRACT

An AC-to-DC power conversion by connecting GTO elements to the positive arms of a three-phase full wave bridge circuit and by repeating the mode of supplying power to a load from an AC power supply by controlling the GTO elements, and the mode of making the current flowing to the load flow back at the time of interruption of the power supply mode, when the power supply mode and the flow-back mode are switched over, overvoltage at the time of the switching is suppressed by simultaneously causing the power supply and flow-back currents to flow.

20 Claims, 11 Drawing Figures

AC-TO-DC POWER CONVERTER WITH IMPROVED POWER FACTOR AND OVERVOLTAGE SUPPRESSION

BACKGROUND OF THE INVENTION

This invention relates to an AC-to-DC power converter apparatus.

Heretofore, various proposals have been made on apparatus employing full wave bridge circuits for obtaining variable DC power from AC power sources or for converting DC to AC power and they have been put to practical use. Moreover, single-phase or polyphase AC is employed according to the use; although the apparatus which employs polyphase AC is more complicated technically as an apparatus than that which employs single-phase AC, there are many problems in common. A three-phase AC apparatus will be described below and based upon such description, an apparatus employing a single-phase AC will be readily understood.

A full wave bridge circuit is generally made up of thyristors, wherein the ignition phase angles of a group of thyristors connected to the positive arm of the circuit and another group of thyristors connected to its negative arm are made equal, the circuit being used to control output voltage by making the phase angle variable.

However, the disadvantage of this method is that the power-factor is worsened, while the ripple component is increased, in regions where DC output voltage is low.

As the method of improving the disadvantage in such a low output voltage region as this, the present applicant previously proposed U.S. Pat. No. 4,245,293. In the above method, the ignition phase angles of the groups of thyristors on the positive and negative sides in the low output voltage region are defined as being different in order to make improvements by causing a short-circuiting mode between both the groups of thyristors.

However, as further improvements in the powerfactor has been desired recently, the following methods have been proposed.

(1) "A Pulsewidth Controlled AC-to-DC Converter to Improve Power Factor and Waveform of AC Line Current" (IEEE TRANSACTION ON INDUSTRY APPLICATIONS, VOL. IA-15, No. 6, NOVEMBER/DECEMBER, 1979)

(2) British Patent Official Gazette No. 2076233 (corresponding to U.S. Pat. No. 4,361,886).

In either case, the mode of supplying power to an AC load by connecting controllable switching means with the function of breaking current to the positive arm of a full wave bridge circuit to control the switching means and by rectifying an AC power source and the mode of causing the current flowing through the DC load to flow back at the time of breaking current in the power supplying mode are repeated and AC-to-DC power conversion may be carried out.

In this method, it is possible to make the output voltage variable by making variable the period (chopping pulsewidth) of the above power supplying mode and, because the relation between the AC supply source voltage and current is maintained roughly in the same phase, the power-factor is allowed to be close to 1. Due to the development of elements having large capacitance recently such as gate turn-off thyristors (hereafter referred to as "GTO elements") and transistors, this method is attracting attention.

However, it has been made clear that, because the power supplying mode and flowback mode are repeated by forcing the current being supplied to be cut off using the controllable means with the function of breaking the current in this method, the switching means may be destroyed then and made uncontrollable.

SUMMARY OF THE INVENTION

An object of the present invention is to provide a highly reliable power converter apparatus with the greater power-factor by preventing controllable switching means having a current-breaking function from being destroyed at the time of carrying out AC-to-DC power conversion.

The present invention is intended to clarify the fact that, when controllable switching means having a current-breaking function are used to carry out AC-to-DC power conversion by repeating power supplying and flow-back modes, overvoltage is generated on the DC load side at the time of switching both the modes and the overvoltage becomes one of the factors causing the switching means to be destroyed; the feature of the present invention is that it provides a period during which either of supply and flow-back currents are allowed to flow when one mode is switched over to the other so as to suppress the overvoltage on the DC load side.

Other objects and features of the present invention will be subsequently described in detail by the following examples.

BRIEF DESCRIPTION OF THE DRAWING

FIGS. 1–9 are diagrams illustrating examples of the present invention.

FIG. 1 is a structural diagram of a power converter apparatus.

FIG. 2 is a structural diagram of a gate pulse generator circuit.

FIG. 3 is an output pulse waveform chart of the NAND circuit.

FIG. 4 is a waveform chart illustrating the relation between phase voltage and the output pulse of the gate pulse generator circuit.

FIG. 6 a waveform chart of a signal in each portion when a pulse signal regulator circuit is not provided.

FIG. 7 is a graphic representation explanatory of the characteristics of overvoltage.

FIG. 9 is a waveform chart of a signal in each portion when the pulse signal regulator circuit is provided.

DESCRIPTION OF THE PREFERRED EMBODIMENT

Referring now to the examples illustrated, the present invention will be described.

Although the description will be given here in reference to power conversion between a three-phase power supply and AC when a GTO element is employed as controllable switching means with a current-breaking function, it will be readily understood that the present invention can be constructed even when other switching means such a single-phase AC supplies or transistors, chopper apparatus and the like are used.

Figure 1:
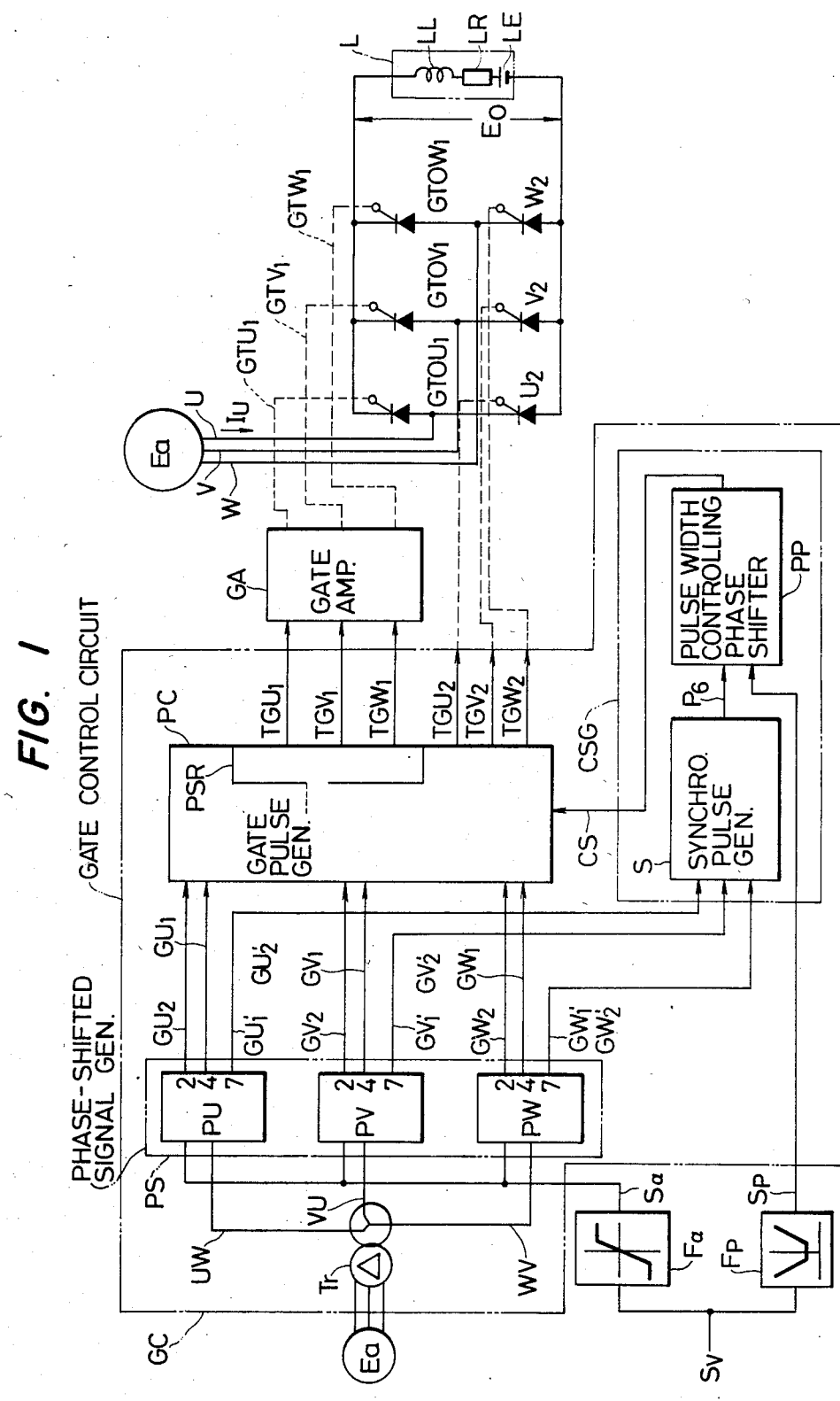

FIG. 1 is an example of the power converter apparatus according to the present invention, wherein its overall configuration is shown.

This example is the one which has been constructed by applying the present invention to the power converter apparatus disclosed in the British Patent Official Gazette No. 2,076,233 (corresponding to U.S. Pat. No. 4,361,866). Accordingly, it is advised to refer to the above British Patent Official Gazette for the construction and operation of this power converter apparatus in detail and the description of the portion related to the present invention is given here in detail as follows:

In FIG. 1, there is shown an full wave bridge circuit comprising GTO elements GTOU1–GTOW1 connected to each of its positive arms and thyristors U2–W2 connected to its negative arms. A three-phase AC supply Ea is connected to an AC terminal of the full wave bridge circuit. Moreover, the DC output voltage Eo of the full wave bridge circuit is applied to a load L including resistance RL, inductance LL, and DC voltage EL. At this time, the time constant LL/RL of the load L is assumed to be sufficiently longer than the period of the AC supply and the DC voltage LE is made to have a value lower than the output voltage Eo. For instance, a condition like this is established when an armature circuit as the load L is connected to control a DC motor by means of the full wave bridge circuit.

In the apparatus thus constructed, a gate control circuit GC controls the DC output voltage Eo by controlling the GTO elements GTOU1–GTOW1 and thyristors U2–W2 according to a voltage command signal Sv.

This gate control circuit GC is mainly made up of a phase-shifted signal generator PS, a chopping signal generator CSG and a gate pulse generator PC.

The details of this gate control circuit conform to those described in the above British Patent Official Gazette No. 2,076,233 (corresponding to U.S. Pat. No. 4,361,866); consequently, it will be only briefly discussed hereafter.

In FIG. 1, a transformer Tr converts the three-phase supply Ea to line voltages UW, VU, WV having a neutral point and inputs the voltages to phase shifters PU, PV, PW. The input of a phase commanding signal Sα is also given to the phase shifters PU, PV, PW. The phase commanding signal Sα is prepared by a function generator Fα having such an output (shown) that the control angle of lag α becomes zero within a large range of voltage commanding signals Sv, or a large range of output voltage. Therefore, the phase shifters PU, PV, PW generate a phase pulse corresponding to the phase commanding signal Sα and inputs the pulse to the gate pulse generator circuit PC and chopping signal generator circuit CGS. At this time, the positive half wave of the supply Ea and the negative half wave of the supply Ea are generated from pins No. 4 and 2 of the phase shifters PU, PV, PW, respectively. Moreover, a known pin No. 7 generates pulses GU'1–GW'1, GU'2–GW'2 of the positive and negative half waves of the supply Ea.

This pin No. 7 inputs the phase-shifting pulse signals GU'1,–GW'1, GU'2–GW'2 of the positive and negative half waves generated to a synchronizing pulse generator circuit S. This synchronizing pulse generator circuit S is composed of a pulse generator, a flip flop and the like, and drives the pulse generator in synchronism with the phase shifting pulse signals GU'1–GW'2 while generating a synchronizing pulse P6 with frequencies higher than those of the AC supply Ea.

This synchrozing pulse P6 is used as a chopping reference pulse of the pulsewidth control phase shifter PP of the GTO element.

A pulsewidth commanding signal $S_P$ is applied to the GTO pulsewidth control phase shifter PP. This GTO pulsewidth commanding signal $S_P$ is obtained from a function generator $F_P$ generating such a signal (characteristics are shown) as is provided with small and constant pulsewidth within a small range of voltage commanding signals Sv, or small range of output voltage, and with large pulsewidth within a large range of voltage commanding signals Sv, or a large range of output voltage. The GTO pulsewidth control phase shifter PP generates a chopping signal CS corresponding to the pulsewidth commanding signal $S_P$ with the frequency of the synchronizing pulse P6 and inputs the signal to the gate pulse generator circuit PC.

The gate pulse generator circuit PC generates pulse signals TGU1–TGW1 for the GTO elements GTOU1–GTOW1 and gate signals TGU2–TGW2 for the thyristors U2–W2 based on the above-mentioned input signals as described later.

The pulse signals TGU1–TGW1 is given to a gate signal amplifier GA. The gate signal amplifier GA generates gate pulses GTU1–GTW1 sent to the GTO elements GTOU1–GTOW1.

In the apparatus thus constructed as the example of the present invention, the feature is that the pulse signal regulator circuit PSR is provided in the pulse generator circuit PC so as to regulate the pulse signals TGU1–TGW1 in such a manner that the power supply and flow-back modes of the full wave bridge circuit are overlapped.

Figure 2:
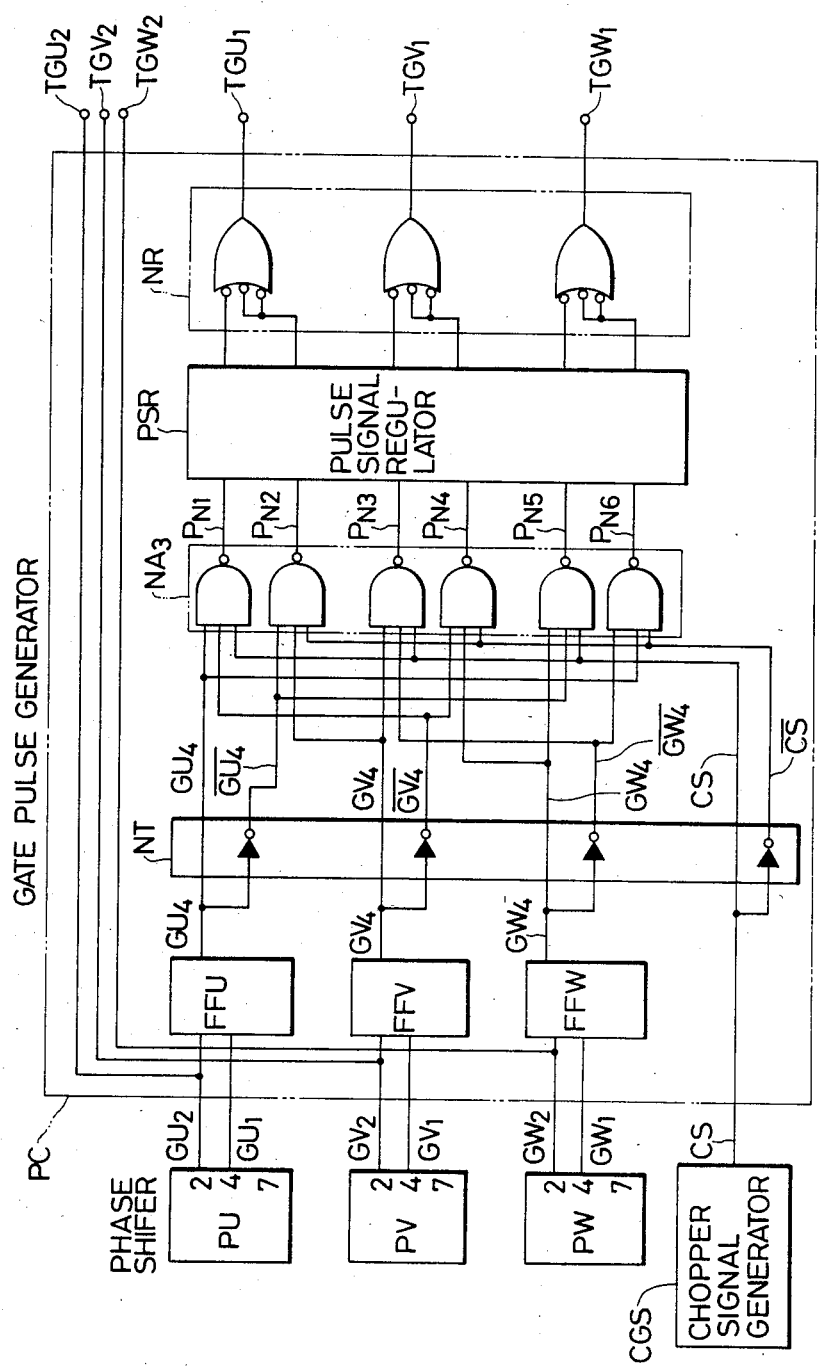

The details of the pulse generator circuit PC is subsequently shown in FIG. 2. In FIG. 2, except for the fact that the pulse signal regulator circuit PSR is provided, the pulse generator circuit is the same as what has been disclosed in the British Patent Official Gazette No. 1,076,233.

Figure 4:
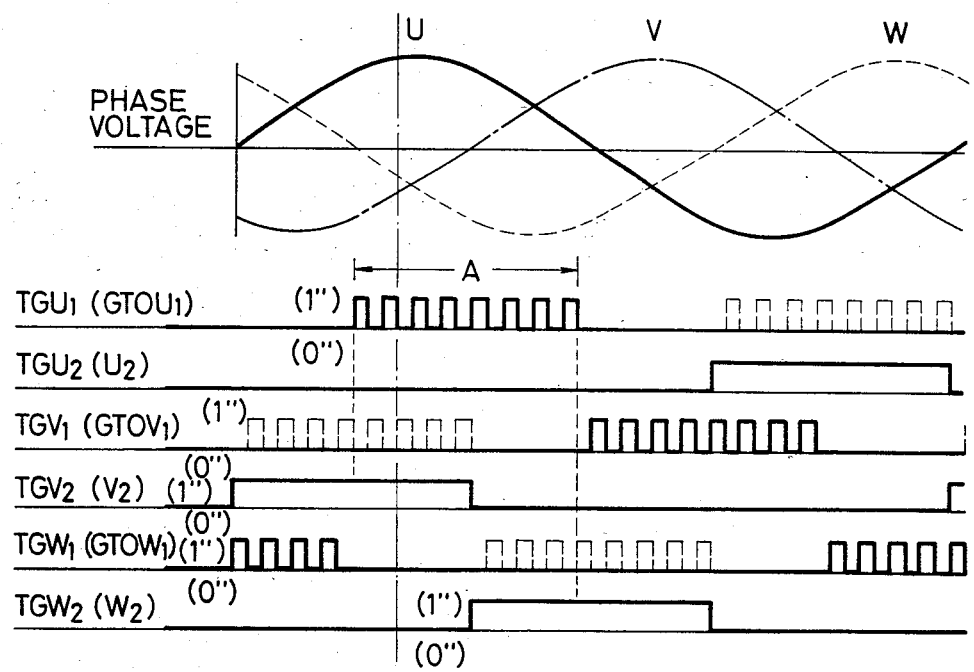

In other words, the pulses GU2–GW2 obtained from the terminals of the three phase phase shifter PU–PW are used as the gate signals TGU2–TGW2 for the thyristors U2–W2. FIG. 4 illustrates the waveforms of the gate signals TGU2–TGW2.

On the other hand, a group of pulses GU1–GW2 obtained from the terminals 2 and 4 of the three phase phase shifters PU–PW are given to flip flop circuits FFU–FFW to obtain output pulses GU4–GW4. These pulses GU4–GW4 and the chopping signal CS from the chopper signal generator CGS are applied to an inverter circuit NT so that pulses $\overline{GR4}$–$\overline{GW4}$ with inverted codes and $\overline{CS}$ can be obtained.

Figure 3:
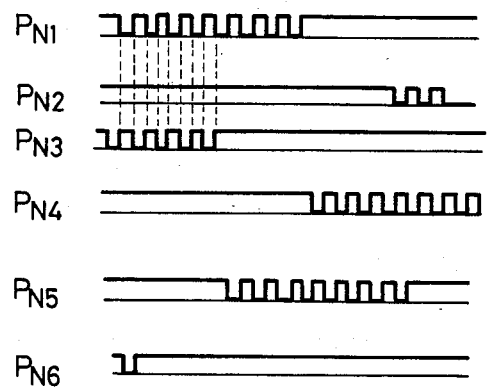

Based on the above pulses, a NAND circuit NA3 outputs pulses PN1–PN6 shown in FIG. 3. These pulses PN1–PN6 are given to a NOR circuit NR through the pulse signal regulator circuit PSR as described later and the NOR circuit NR outputs the pulses TGU1–TGW1 shown in FIG. 4. The pulses TGU1–TGW1 indicate a period during which each of the GTO elements GTOU1–GTOW1 are conducting.

FIG. 4 illustrates the waveforms of the phase voltages U, V, W of the three phase AC supply Ea, pulse signals TGV1–TGW1 and gate signals TGV2–TGW2. The pulse signals TGV1–TGW1 are converted to those which turn on the GTO element at the time of its rising by means of the gate signal amplifier GA and off the element at the time of its decaying, and become the gate signals GTU1–GTW1 for the GTO elements. As a result, the pulse signals TGV1–TGW1 indicate a period during which the GTO elements GTOU1–GTOW1 are conducting when they are "1", whereas a period during which the GTO elements GTOU1–GTOW1 are not conducting when they are "0".

Figure 5A:
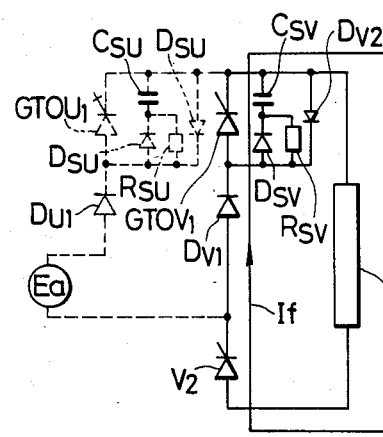
FIGS. 5A and 5B are a diagram illustrating flow-back and power supply modes in operation.
Figure 5B:
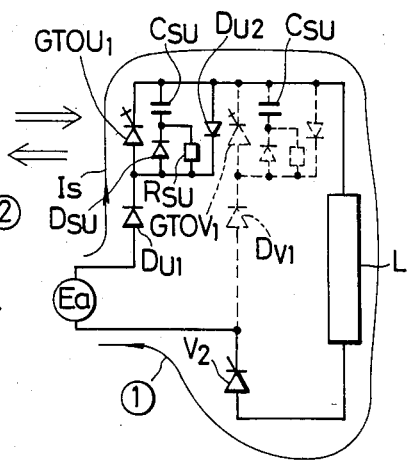

Accordingly, the operation during a period A in FIG. 4 is such that, because the pulse signal TGU1 and gate signal TGV2 are "1" at first, the GTO element GTOU1 and thyristor V2 conducts, forming the mode in which power is supplied from the supply Ea to the load L. In other words, a circuit shown by an actual line in FIG. 5(B) is formed and supply current Is from the supply Ea is allowed to flow along a loop ①.

Subsequently, when the pulse signals TGU1 and TGV1 become "0" and "1", respectively, the GTO element GTOU1 is cut off, whereas the GTO element GTOV1 conducts. Therefore, the supply current Is breaks, forming the flow-back mode in which load current up to that time flows through the thyristor V2 and GTO element GTOV1; that is, a circuit shown by an actual line in FIG. 5(A) is formed, causing flow-back current If to flow in the route along a loop ②.

When the pulse signals TGU1 and TGV1 become "1" and "0" again, the circuit in FIG. (B) is formed and power is supplied for the Ea to the load L again.

In the first half of the period (A), the on-off operations of the above GTOU1 and GTOV1 form a pair and cause the power supply and flow-back modes to be alternately repeated so as to supply DC power to the load L.

In the second half of the period (A), as clearly shown in the waveforms in FIG. 4, the on-off operations of the GTO elements GTOU1 and GTOW1 cause the power supply and flow-back modes to be alternately repeated so as to supply DC power to the load L.

Although the operations during the period (A) have been described up to now, corresponding GTO elements GTOU1–GTOW1 are controlled during another period according to the relation illustrated in FIG. 4.

Therefore, if the pulse signals TGU1–TGW1 during the period "1" are controlled, the DC output voltage Eo will be also controlled.

A capacitor $C_{SU}$, diode $D_{SU}$ and resistor $R_{SU}$ added to FIG. 5 constitute a known snubber circuit for absorbing overvoltage generated when the GTO element GTOU1 is interruped. Moreover, diodes $D_{U1}$, $D_{U2}$ are intended to protect the GTO element GTOU1 from reverse voltage. These snubber circuit and diodes $D_{U1}$, $D_{U2}$ are provided in each of other GTO elements GTOV1, GTOW2.

Figure 6:
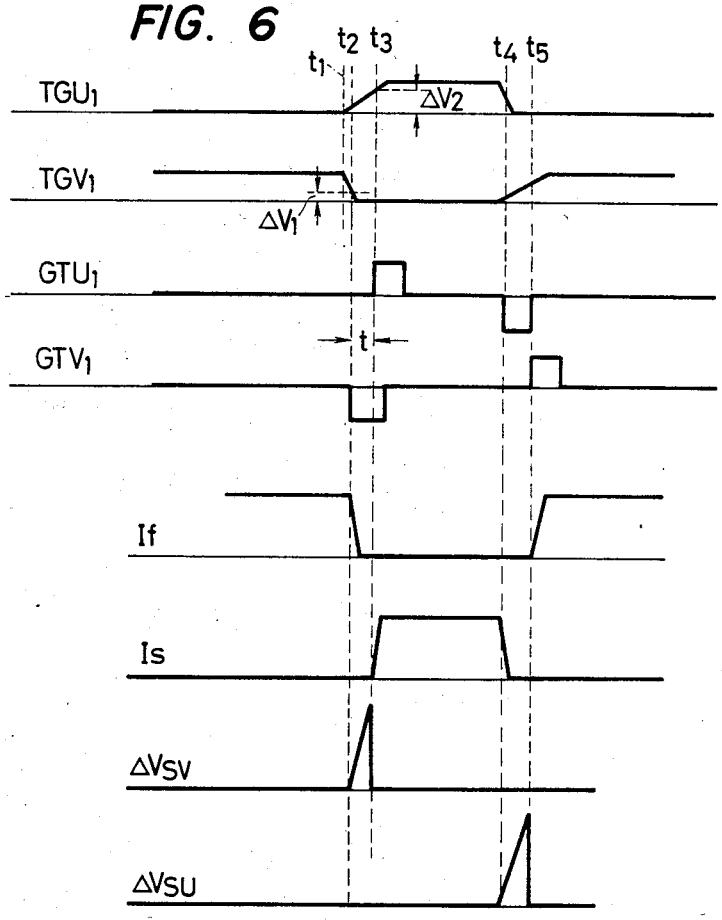

In the meantime, the conventional pulse signal TGU1–TGW1 as shown in FIG. 6 tends to cause by nature its rising to be delayed and its decaying to be quickened. This is due to the connected capacitor for improving noise resistance and the floating capacitance of a signal line and is the phenomenon necessarily occurred because of the circuit configuration.

Although each one of the pulse signals GU1 and TGV1 is shown in FIG. 6, the same is applied to other pulse signals.

In FIG. 6, the pulse signal TGV1 sharply decays at time t1, whereas the pulse signal TGU1 slowly rises. The pulse signals TGV1 and TGU7 are applied to the gate signal amplifier GA and converted to the gate signals GTV1 and GTU1. The gate signal amplifier GA is known to generate a gate signal when off voltage becomes less than $\Delta V1$ and an on gate signal when on voltage exceeds $\Delta V2$.

Consequently, the on gate signal is generated in the gate signal GTV1 at the time T2 when the pulse signal TGV1 becomes less than $\Delta V1$. However, because the rise of the pulse signal TGU1 is slow, the off gate signal is generated in the gate signal GTU1 at time t3; that is, the time difference between the off gate of the gate signal GTV1 and the on gate of the gate signal GTU1 occurs.

For this reason, a time difference occurs after interrupting the flow-back current If using the GTO element GTOV1 and before making the GTO element GTOU1 conduct.

The constant-current operation of the inductance component LL of the load L causes the flow-back current to flow into the capacitor $C_{SV}$ connected to GTOV1 in parallel during the time difference t. The charge voltage $\Delta V_{SV}$ of the capacitor $C_{SV}$ at this time becomes $\Delta V_{SV} = If \cdot T/C_{SV}$ and this voltage is applied to the GTO element GTOV1.

For the same reason, after the off gate is generated in the gate signal GTU1 at the time t4, the on gate is generated in the gate signal GTV1 at the time t5. Therefore, the constant current operation of the inductance component LL of the load L in this case causes the current to flow into the capacitor $C_{SU}$ connected to the GTO element GTOU1 in parallel. The charge voltage $\Delta V_{SU}$ of the capacitor $C_{SU}$ in this case becomes much greater because the supply voltage Ea is added.

Figure 7:
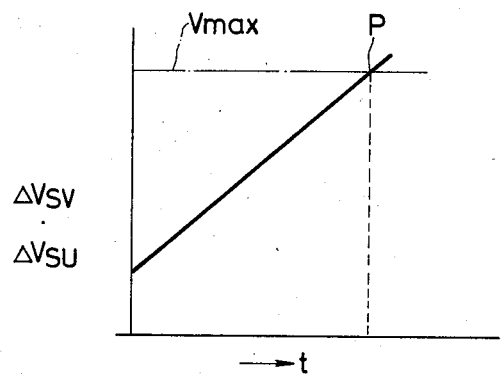

If the above time difference t is long, the charge voltages $\Delta V_{SU}$, $\Delta V_{SV}$ will exceed, as shown in FIG. 7, the threshold voltage Vmax allowable for the GTO elements GTOU1–GTOW1, causing the breakdown of the GTO elements.

On the contrary, since this example is equipped with the pulse signal regulator circuit PSR for regulating the pulse signals TGU1–TGW1, such a phenomenon will not occur.

Figure 8A:
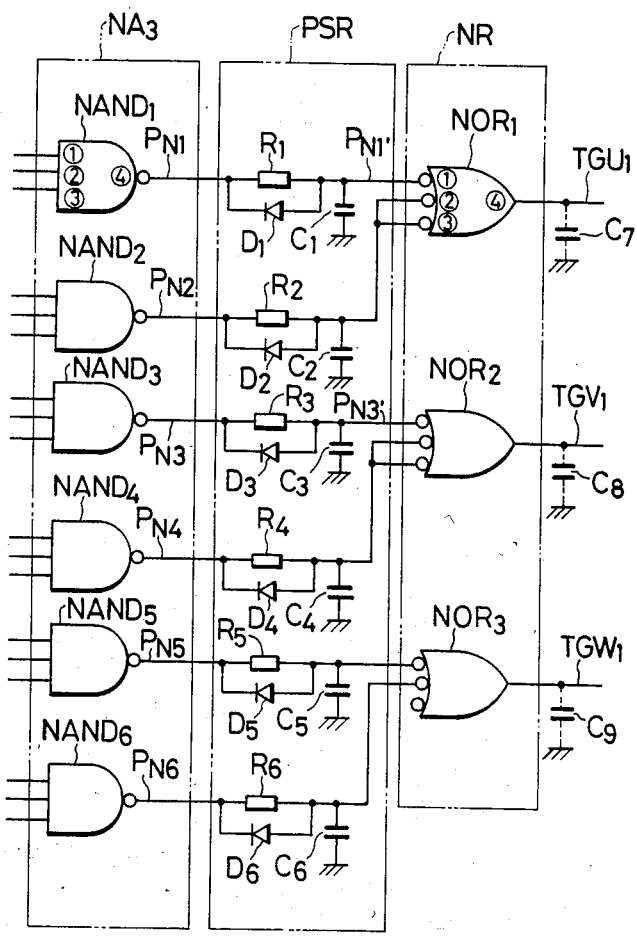
FIG. 8(A) is a structural diagram of the pulse signal regulator circuit.

FIG. 8 shows the configuration of the pulse signal regulator circuit PSR. As shown in FIG. 8, the circuit comprises resistors R1–R6, diodes D1–D6 and capacitors C1–C6.

Figure 8B:
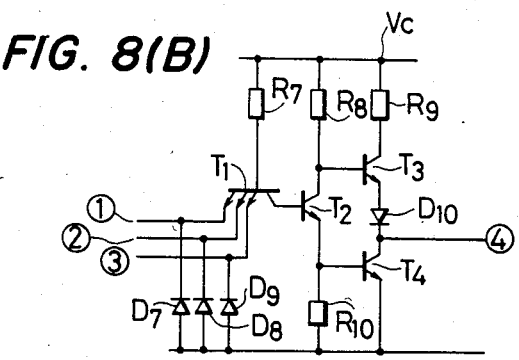
FIG. 8(B) is an internal configuration of NAND and NOR elements.

This circuit, however, assumes that ordinary elements shown in FIG. 8(B) are used for NAND elements NAND1–NAND6 forming the NAND circuit NA3 and for NOR elements NOR1–NOR3 forming the NOR circuit NR. Both of them which are similar to each other with the same function are usable. Since the elements are those well known, further detailed description of them will be omitted; the element itself is composed of transistors T1–T4, diodes D7–D10, resistors R7–R10 and a power supply Vc. Accordingly, if the signal "0" is applied to any of the terminals (1)–(3), the transistors T1 and T3 will be turned on, whereas the transistor T2 and T4 will be turned off; thus "1" appears in the output terminal (4) because of the supply Vc. Only when the input signals of the input terminals (1)–(3) all become "1", the above operation is inverted and the transistor T4 is turned on, whereas the output terminal (4) becomes "0" becauseo of shortcircuiting.

The pulse signal regulator circuit PSR inputs the output pulse signals $P_{N1}$–$P_{N6}$ of the NAND circuit NA3 shown in FIG. 3 and regulates the circuit in such a manner that overlapping occurs when the pulse signals TGU1–TGW1 rise and decay. For this reason, it has been so arranged that the above overvoltage generated in the full wave bridge circuit may be suppressed.

The operation of the circuit is as follows:

As has already been described, the time difference shown in FIG. 6 occurs in the conventional pulse signals TGU1-TGW1. This is due to the capacitor connected for absorbing surge and the floating capacitance of a signal line; this is equivalently shown in FIG. 8(A) by means of capacitors C7-C9.

The pulse signals TGU1-TGW1 are prepared by the NOR circuit NR based on the pulse signals $P_{N1}$-$P_{N6}$ shown in FIG. 3. Consequently, in this example, the object of the present invention has been attained by regulating these pulse signals $P_{n1}$-$P_{N6}$.

Taking the operation of the above pulse signals TGU1 and TGV1 in the form of a pair as an example, what has been mentioned above is explained.

When the pulse signals $P_{N2}$ and $P_{N4}$ are in the state of "1", the operation is conducted by the pulse signals $P_{N1}$-$P_{N3}$. In other words, when the pulse signal $P_{N1}$ is in the state of "1", the pulse signal $P_{N3}$ is in the state of "0" and the pulse signals TGU1 and TGV1 are in such a state that their codes are inverted.

Figure 9:
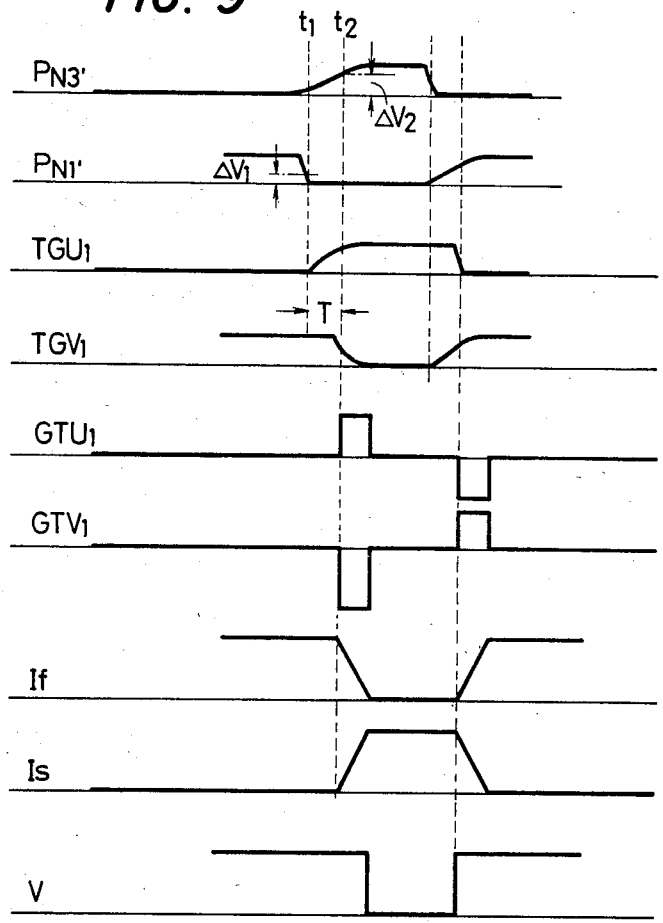

In this case, because the elements shown in FIG. 8(B) are used for the NAND elements NAND1, NAND3 and their outputs are connected to the pulse signal regulator circuit PSR, the relation between the pulse signals $P_{N1}$, $P_{N3}$ and TGU1, TGV1 changes in such a way as is shown in FIG. 9.

In other words, the pulse signal $P_{N1}$ rises with the time constant consisting of the internal resistance R9 of the NAND element NAND 1, resistance R1 and capacitor C1. On the other hand, when the signal $P_{N1}$ decays, the charge of the capacitor C1 sharply decays through the diode D1 and the internal transistor T4 of the NAND element NAND1. Therefore, input signal $P_{N1'}$ of the NOR element NOR1 has a pulse slow in rising and quick in decaying.

This is also applicable to the input signal $P_{N3'}$ of the NOR element NOR2.

Accordingly, in connection with the outputs of the NOR elements NOR1 and NOR2 to which pulse signals $P_{N1'}$ and $P_{N3'}$, as shown in FIG. 9, the pulse signal TGU1 rises at the time t1, whereas the pulse signal TGV1 decays at the time t2; that is, an overlapped time T becomes available.

The pulse signals TGU1 and TGV1, based on the relation between the NOR elements NOR1, NOR2 and the capacitor for absorbing surge and floating capacitance show their waveforms slow in rising and quick in decaying.

However, due to the above overlapping time T, no time difference occurs in the gates signals GTU1 and GTV1 as the outputs of the gate signal amplifier GA. In other words, it becomes possible to give the on gate signal TGU1 to the GTO element GTOU1 and simultaneously the off gate signal to the GTO element GTOV1, and vice versa.

Accordingly, the power supply mode of the GTO element GTOU1, load L, thyristor V2, and supply Ea occurs on the instant that the operating of interrupting the current If flowing in the flow-black of the GTO element GTOV1, load L and thyristor V2; that is, as shown in FIG. 9, the flow-back current If is decreasing, while the power supply current Is is increasing.

In this case, the GTO/element GTOV1 conducts the so-called operation of rectifying the supply, or turning-off as the GTO/element GTOU1 operates, so that an overvoltage because of the inductance LL of the load L will not occur.

The above operation is also applicable to a case in which the GTO element GTOV1 is made to conduct by interrupting the GTO element GTOU1, that is, the power supply mode is switched over to the flow-back one, and the overvoltage can be suppressed.

As mentioned above, because when the power supply mode is changed to the flow-back mode, the period during which both the mode simultaneously occurs is provided, the generation of the overvoltage as the reason for the breakdown of the switching means can be suppressed and the reliability of a power converter apparatus may be improved.

In the examples described until now, reference has been made to the case of employing the pulse signal regulator PSR but the present invention is not limited to such a case. In other words, it is readily realizable to overlap the pulse signals $P_{N1}$-$P_{N6}$ by means of a computer and to overlap the pulse signals TGU1-TGW1 and further the gate signals GTU1-GTW1 by means of a timing factor or a computer.

In addition, switching means having a currentbreaking function are not limited to GTO elements and, as mention has been made in the beginning, known transistors, chopper apparatus and the like may also be employed.

We claim:

1. A power converter apparatus comprising an AC power supply, a DC load and controllable switching means connected across said AC power supply and said DC load and provided with a current-breaking function for alternately repeating the mode of rectifying said AC power and supplying power to said DC load and the mode of making the current flowing to said DC load flow back, pulse generating means for generating a gate-on pulse for one of the power supply mode and the flow-back mode and a gate-off pulse for one of the flow-back mode and the power supply mode, said power converter apparatus being futher provided with gate control means response to the gate pulses from said pulse generating means for controlling said controllable switching means so that said power supply current and said flow-back current simultaneously flow at the time of said power supply to flow-back-mode switching.

2. A power converter apparatus as claimed in claim 1, wherein said gate control means controls said controllable switching means in such a way that said flow-back current is made to rise during a period of time that said power supply current is attenuating, whereby an overvoltage occurring at the time of the mode switching is suppressed and a breakdown of the switching means due to the overvoltage is prevented.

3. A power converter apparatus as claimed in claim 1, wherein said gate control means controls said controllable switching means in such a manner that said power supply current is allowed to rise during a period of time that said flow-back current is attenuating, whereby an overvoltage occurring at the time of the mode switching is suppressed and a breakdown of the switching means due to the overvoltage is prevented.

4. A power converter apparatus as claimed in claim 1, wherein said gate control means enables said controllable switching means forming said flow-back mode to hold an on state while said controllable switching means forming said power supply mode is holding an off state.

5. A power converter apparatus as claimed in claim 1, wherein said gate control means enables simultaneous application of the gate-off pulse and the gate-on pulse for said controllable switching means forming said power supply mode and said flow-back mode, respectively.

6. A power converter apparatus as claimed in claim 1, wherein said gate control means enables said controllable switching means forming said power supply mode to hold an on state while said switching means forming said flow-back mode is holding an off state.

7. A power converter apparatus as claimed in claim 6, wherein said gate control means enables simultaneous application of the gate-off pulse and the gate-on pulse for said controllable switching means forming said flow-back mode and said power supply mode, respectively.

8. A power converter apparatus as claimed in claim 1, wherein a full wave bridge rectifier circuit is connected across said AC power supply and said DC load, said controllable switching means forming each of a plurality of arms of said full wave bridge circuit.

9. A power converter apparatus as claimed in claim 8, wherein said controllable swithcing means form the positive arm of said full wave bridge circuit, whereas thyristors form the negative arms.

10. A power converter apparatus as claimed in claim 8, wherein said power supply mode is formed by making any of said controllable switching means of said full wave bridge circuit conduct, whereas said flow-back mode is formed by making said controllable switching means forming arms forming a closed loop with said DC load conduct.

11. A power converter apparatus as claimed in claim 10, wherein said gate control means operates to overlap a terminating point of a period during which said controllable switching means forming said power supply mode is conducting and a starting point of a period during which said controllable switching means forming said flowback mode is conducting.

12. A power converter apparatus as claimed in claim 10, wherein said gate control means operates to overlap a terminating point of a period during which said controllable switching means forming said flow-back mode is conducting and a starting point of a period during which said controllable switching means forming said power supply mode is conducting.

13. A power converter apparatus comprising an AC power source, a DC load, and a plurality of controllable switching means connected between said AC power source and said DC load and each having an electric current cut-off function for enabling a switching in accordance with gate pulses cyclically between a power-supply mode in which the current from said AC power source is rectified and supplied to said DC load and a flow-back mode in which the electric current in said DC load is fed back, pulse generating means for generating a gate-on pulse for said flow-back mode before the generation of a gate-off pulse for said power-supply mode, and means for supplying gate pulses to said controllable switching means in response to the generated pulses from said pulse generating means for enabling power-supply current and flow-back current to simultaneously flow at a time of mode switching, whereby an overvoltage occurring at the time of the mode switching is suppressed and a breakdown of the controllable switching means due to the overvoltage is prevented.

14. A power converter apparatus as claimed in claim 13, wherein a full wave bridge circuit is connected across said AC power supply and said DC load, said controllable switching means forming each of a plurality of arms of said full wave bridge circuit.

15. A power converter apparatus as claimed in claim 14, wherein said controllable switching means form the positive arm of said full wave bridge circuit, whereas thyristors are connected to the negative arms of said full wave bridge circuit.

16. A power converter apparatus as claimed in claim 14, wherein said power-supply mode is formed by making any of said controllable switching means forming said full wave bridge circuit conduct, whereas said flow-back mode is formed by making said controllable switching means forming arms forming a closed loop with said DC load conduct.

17. A power converter apparatus comprising an AC power source, a DC load, and a plurality of controllable switching means connected between said AC power source and said DC load and each having an electric current cut-off function for enabling switching in accordance with gate pulses cyclically between a power-supply mode in which the current from said AC power source is rectified and supplied to said DC load and a flow-back mode in which the electric current in said DC load is fed back, pulse generating means for generating a gate-on pulse for said power-supply mode before the generation of a gate-off pulse for said flow-back mode, and means for supplying gate pulses to said controllable switching means in response to the generated pulses from said pulse generation means for enabling power-supply current and flow-back current to simultaneously flow at a time of mode switching, whereby an overvoltage occurring at the time of the mode switching is suppressed and a breakdown of the controllable switching means due to the overvoltage is prevented.

18. A power converter apparatus as claimed in claim 17, wherein a full wave bridge circuit is connected across said AC power supply and said DC load, said controllable switching means forming to each of a plurality of arms of said full wave bridge circuit.

19. A power converter apparatus as claimed in claim 18, wherein said switching means forming the positive arm of said full wave bridge circuit, whereas thyristors forming the negative arms of said controllable full wave bridge circuit.

20. A power converter apparatus as claimed in claim 18, wherein said power-supply mode is formed by making any of said controllable switching means forming said full wave bridge circuit conduct, whereas said flow-back mode is formed by making said controllable switching means forming arms forming a closed loop with said DC load conduct.

* * * * *